United States Patent
Dottax et al.

(10) Patent No.: US 10,038,560 B2
(45) Date of Patent: Jul. 31, 2018

(54) METHOD FOR VALIDATING A CRYPTOGRAPHIC PARAMETER AND CORRESPONDING DEVICE

(71) Applicant: Oberthur Technologies, Colombes (FR)

(72) Inventors: Emmanuelle Dottax, Colombes (FR); Franck Rondepierre, Colombes (FR)

(73) Assignee: IDEMIA FRANCE, Colombes (FR)

( * ) Notice: Subject to any disclaimer, the term of this patent is extended or adjusted under 35 U.S.C. 154(b) by 25 days.

(21) Appl. No.: 14/266,327

(22) Filed: Apr. 30, 2014

(65) Prior Publication Data

US 2014/0369493 A1    Dec. 18, 2014

(30) Foreign Application Priority Data

Apr. 30, 2013   (FR) ...................................... 13 53990

(51) Int. Cl.
| | | |
|---|---|---|
| *H04L 9/30* | (2006.01) | |
| *H04L 9/32* | (2006.01) | |
| *H04L 9/00* | (2006.01) | |
| *G06F 21/34* | (2013.01) | |
| *G06F 21/44* | (2013.01) | |

(52) U.S. Cl.
CPC ............ *H04L 9/3252* (2013.01); *G06F 21/34* (2013.01); *G06F 21/44* (2013.01); *H04L 9/002* (2013.01); *H04L 9/3066* (2013.01); *H04L 9/3239* (2013.01); *H04L 2209/72* (2013.01); *H04L 2209/805* (2013.01)

(58) Field of Classification Search
None
See application file for complete search history.

(56) References Cited

U.S. PATENT DOCUMENTS 5,502,767 A * 3/1996 Sasuta ....................... H04L 9/12
380/260
7,215,773 B1 * 5/2007 Johnson ................ H04L 9/3066
380/259

(Continued)

FOREIGN PATENT DOCUMENTS

| EP | 2165292 A2 | 3/2010 |
| EP | 2525524 A1 | 11/2012 |

(Continued)

OTHER PUBLICATIONS

Lepinski et al., "Additional Diffie-Hellman Groups for Use with IEFT Standards", Network Working Group, Request for Comments: 5114, Jan. 2008. http://tools.ietf.org/html/rfc5114.

(Continued)

*Primary Examiner* — Michael R Vaughan
(74) *Attorney, Agent, or Firm* — David D. Brush; Westman, Champlin & Koehler, P.A.

(57) ABSTRACT

An electronic device is proposed, which is configured to receive at least one cryptographic parameter and validate the at least one cryptographic parameter. The electronic device is is configured to validating the parameter by determining an imprint from a one-way function and from at least the cryptographic parameter; detecting at least one part of the imprint in a dedicated memory zone of the electronic device, and delivering a piece of information on validation should there be effective detection.

22 Claims, 3 Drawing Sheets

(b)

(56) References Cited

U.S. PATENT DOCUMENTS

| | | | | |
|---|---|---|---|---|
| 8,983,064 | B2* | 3/2015 | Vanstone | H04L 9/0841 380/28 |
| 9,137,221 | B2* | 9/2015 | Dottax | G06Q 20/341 |
| 9,210,134 | B2* | 12/2015 | Dottax | G06F 21/46 |
| 2002/0172356 | A1* | 11/2002 | Ono | G06F 7/723 380/28 |
| 2004/0114760 | A1 | 6/2004 | Brown et al. | |
| 2006/0153371 | A1* | 7/2006 | Beeson | H04L 9/3073 380/30 |
| 2006/0274894 | A1 | 12/2006 | Vasyltsov et al. | |
| 2010/0088518 | A1* | 4/2010 | Dottax | G06Q 20/341 713/175 |
| 2011/0243323 | A1* | 10/2011 | Sato | A61B 1/00009 380/200 |
| 2013/0129087 | A1* | 5/2013 | Qi | G06F 21/602 380/44 |
| 2013/0290712 | A1* | 10/2013 | Zaverucha | H04L 9/3252 713/168 |
| 2013/0326235 | A1* | 12/2013 | Meister | H04L 9/0841 713/189 |
| 2014/0211938 | A1* | 7/2014 | Campagna | H04L 9/3252 380/44 |
| 2014/0245005 | A1* | 8/2014 | Dottax | G06F 21/46 713/168 |

FOREIGN PATENT DOCUMENTS

| | | |
|---|---|---|
| JP | 2009239797 A | 10/2009 |
| WO | 2009001199 A2 | 12/2008 |

OTHER PUBLICATIONS

Lochter et al., "Elliptic Curve Cryptography (ECC) Brainpool Standard Curves and Curve Generation" Independent Submission, Request for Comments: 5639, Mar. 2010. http://tools.ietf.org/html/rfc5639.

Certicom Research, "SEC1: Elliptic Curve Cryptography", Sep. 20, 2000.

Certicom Research, "SEC 2: Recommended Elliptic Curve Domain Parameters" Sep. 20, 2000.

Ivey-Law et al., "Finding Cryptographically Strong Elliptic Curves—A Technical Report", Feb. 7, 2010.

Zhang et al., "Compact Representation of Domain Parameters of Hyperelliptic Curve Cryptosystems",.

ICart, "How to Hash into Elliptic Curves".

European Telecommunication Standards Institute, "GSM 03.48 Version 1.0.0 (Oct. 1997) SIM Toolkit Secure Messaging; GSM 03.48" Oct. 1997.

Global Platform, "GlobalPlatform's Proposition for NFC Mobile: Secure Element Management and Messaging" White Paper, Apr. 2009.

U.S. Department of Commerce/ National Institute of Standards and Technology, "Digital Signature Standard (DSS)" Federal Information Processing Standards Publication, FIPS PUB 186-2, Jan. 27, 2000.

Turner et al., "Elliptic Curve Private Key Structure" Internet Engineering Task Force (IETF) Request for Comments 5915, Jun. 2010. http://tools.ietf.org/html/rfc5915.

Turner et al., "Elliptic Curve Cryptography Subject Public Key Information" Network Working Group, Request for Comments: 5480, Mar. 2009. http://tools.ietf.org/html/rfc5480.

French Search Report and Written Opinion dated Jan. 29, 2014 for corresponding French Application No. 1353990, filed Apr. 30, 2013.

ANS X9.62-2005, "Public Key Cryptography for the Financial Services Industry the Elliptic Curve Digital Signature Algorithm (ECDSA)". Nov. 16, 2005.

Darrel Flankerson et al., "Guide to Elliptic Curve Cryptography", ISBN 0-387-95273-X, 2004, Springer-Verlag New York, Inc.

ISO/CEI 15946-5:2009, "Information technology—Security techniques—Cryptographic techniques based on elliptic curves—Part 5: Elliptic curve generation", International Standard, First edition, Dec. 15, 2009.

ISO/CEI 15946-1:2008, "Information technology—Security techniques—Cryptographic techniques based on elliptic curves—Part 1: General", International Standard, Second edition, Apr. 15, 2008.

IEEE Std 1363-2000, "IEEE Standard Specifications for Public-Key Cryptography", The Institute of Electrical and Electronics Engineers, Inc., Published Aug. 29, 2000.

IEEE Std 1363a-2004, "IEEE Standard Specifications for Public-Key Cryptography—Amendment 1: Additional Techniques", The Institute of Electrical and Electronics Engineers, Inc., Published Sep. 2, 2004.

International Civil Aviation Organization, "Machine Readable Travel Documents Sixth Edition—2006 Doc 9303 Part 1, Machine Readable Passports vol. 2, Specifications for Electronically Enabled Passports with Biometric Identification Capability" Sixth Edition—2006.

International Civil Aviation Organization, "Machine Readable Travel Documents Third Edition—2008 Doc 9303, Part Machine Readable Official Travel Documents vol. 2, Specifications for Electronically Enabled MRtds with Biometric Identification Capability", Third Edition—2008.

European Patent Office Communication and machine translation dated Dec. 12, 2016 for corresponding European Application No. 14166462.3.

European Office Action dated Oct. 13, 2017 for corresponding European Application No. 14166462.3.

* cited by examiner (a)

(b)

METHOD FOR VALIDATING A CRYPTOGRAPHIC PARAMETER AND CORRESPONDING DEVICE

1. FIELD OF THE INVENTION

The field of the invention is that of cryptography.

More specifically, the invention pertains to a technique applicable, inter alia, to cryptosystems based on the use of hyperelliptic and especially elliptic curves.

The invention has numerous applications, for example in the industry of smart cards used in passports, mobile telephones, etc.

More generally, it can be applied in all cases where such cryptosystems are used.

2. TECHNOLOGICAL BACKGROUND

We shall attempt more particularly here below in this document to describe the issues and problems that exist in the field of elliptic curves and have been faced by the inventors of the present patent application. The invention naturally is not limited to this particular field of application but is of interest for all techniques using cryptographic parameters that have to cope with proximate or similar issues and problems.

Cryptosystems based on the use of elliptic curves have numerous advantages when compared with other asymmetrical cryptographic techniques such as RSA (Rivest Shamir Adleman), DSA (Digital Signature Algorithm) etc. More specifically, the cryptographic keys used in cryptosystems based on the use of elliptic curves have sizes (in numbers of bits) that are smaller than those used in the asymmetrical cryptographic techniques mentioned here above but provide equivalent or even greater security. In addition, the execution time for such cryptosystems based on elliptic curves is generally smaller than that of these other asymmetrical cryptographic techniques. This is why many standards-setting organizations promote the use of such cryptosystems. For example, the International Civil Aviation Organization (ICAO) which has standardized the electronic devices (in this case terminals) that have to read electronic documents (such as passports comprising electronic devices (a smart card for example), as well as, in a de facto manner, the document referenced "Doc 9303q stipulate the use of BAC (Basic Access Control) and PACE (Password Authenticated Connection Establishment) protocols which use operations on elliptic curves to secure exchanges between electronic devices (in this case between a terminal and a passport comprising a smart card). In addition, it must be noted that the SAC (Supplemental Access Control) protocol which is a more secured version of the BAC protocol and is itself also based on the use of elliptic curves, is tending to replace the BAC protocol. Here below, the generic term "electronic device" shall be used to denote a device that can be either such a terminal, or a smart card or any other equivalent device.

It must be noted that, before using an elliptic curve in a cryptosystem, an electronic device must necessarily ascertain that the parameters defining a curve comply with commonly accepted safety requirements. More specifically, it is generally necessary to implement validation algorithms that are described for example in paragraph 4 (Domain parameters) of the "*Guide to Elliptic Curve Cryptography*" by D. Hankerson et al (ISBN 0-387-95273-X). These algorithms thus ensure that the domain of parameters to be used does not have security flaws.

More specifically, the domain of the parameters, denoted as D, of an elliptic curve is defined by at most eight elements, D=(q, FR, S, a, b, P, n, h), where the number q makes it possible to define the q-element finite field, $F_q$, on which the elliptic curve is defined (i.e. $q=p^m$, with m being an integer greater than or equal to 1, and p being a prime number greater than or equal to 2). The value of FR (for Field Representation) corresponds to an indication of the manner of representing an element belonging to the finite field $F_q$ (for example where the field has the value 2 as its characteristic, this can be the irreducible m degree polynomial necessary to enable the representation of such elements). The numbers a and b are elements belonging to the q-element finite field. They correspond to coefficients enabling the definition of the equation of the elliptic curve considered, namely an equation of the type $y^2=x^3+ax+b$ (when the characteristic of the field $F_q$ is a prime number strictly greater than 2) or of an equation of the type $y^2+xy=x^3+ax^2+b$ (when the characteristic of the field $F_q$ is equal to 2)). The value S corresponds to a seed which is a parameter that has been used to generate the elements a and b (thus, the value of S is not necessarily available for all the elliptic curves). The point P, which belongs to the elliptic curve (i.e. the affine coordinates of which verify the equation of the elliptic curve mentioned here above) and the order of which is the value of n which must be a prime number, can be given either as an affine coordinate or in another representation (a Jacobian representation, etc). Finally, the value h corresponds to that of the cofactor of the elliptic curve which must verify the following equality $h=\#E(F_q)/n$ where $\#E(Fq)$ corresponds to the number of points belonging to the elliptic curve considered.

The algorithm 4.15 (entitled "Explicit Domain parameter validation") of the document "*Guide to Elliptic Curve Cryptography*" mentioned here above describes the different operations that have to be implemented by an electronic device so that it validates the field of parameters received.

It must be noted that the parameters FR and S do not always need to be transmitted. This does away with the need for carrying out certain steps of the algorithm identified. In particular, when a finite field $F_p$ is used, it is not necessary to reference the parameter FR.

As mentioned here above, it is important to perform such a validation for reasons of security. For example, such a validation must be undertaken prior to the validation of a received public key as described in the patent application US20040114760, failing which the security of the exchanges linked to the use of such a public key would be impaired.

Thus, when an electronic device receives a domain of parameters associated with an elliptic curve, given the cumbersome nature (from the viewpoint of both memory space and of CPU (central processing unit) time), of the operations of the algorithm 4.15 mentioned here above, this device can be incapable of performing such operations. Thus, it becomes vitally important to find a solution to the problem of verifying a given domain of parameters.

Since there are numerous standards which, for certain curves, define domains of parameters for use (see for example the document "*SEC 2: Recommended Elliptic Curve Domain Parameters*" prepared by the firm Certicom Research, as well as the document "*Finding cryptograpically Strong Elliptic Curves: A Technical Report I*" by Hamish Ivey Law et al.) that ensure a high level of security, a first solution would be to store, for known and/or standardized curves (for example the curve whose identifier is "secp192k1" (also denoted as "elliptic Curve 31" in the document "*SEC 2*" mentioned here above), the domain of parameters of such curves. Thus, when an electronic device receives a domain of parameters, it must make a secured comparison between the parameters received and the parameters stored.

However, one drawback of such a technique lies in the fact that the electronic device must have substantial memory space to store, for each elliptic curve identifier, the corresponding domain of parameters. Such an approach necessitates the storage of all the parameters on the device. This can be a constraint when numerous curves have to be referenced.

A second solution would consist of the use of the technique described in the standards RFC 5915, RFC 5480 and RFC 5639. This is to send only the name of the curve or an identifier, also called universal identifiers or "curve OIDs" (curve object identifiers).

However, such a technique, which necessitates the storage of all the elements of a domain of parameters, has the same drawbacks as above from the viewpoint of management of the memory of the electronic device.

According to a third solution, the electronic device receives a domain of parameters as well as an identifier of the corresponding curve but this device stores only the identifier. However, such a technique does not guarantee that a valid identifier will be transmitted with a domain of parameters comprising the right parameters for the given curve. Thus, such a solution cannot be envisaged because it provides no guarantee (from a security viewpoint) on the elements received.

Finally, a fourth solution, which is generic (in that in the sense that it can be applied whatever the curve considered, whether or not it is known to the electronic device that receives a domain of parameters), would consist, from an algorithmic point of view, in optimizing the steps of the algorithm 4.15 to accelerate the verification of the elements of the domain of parameters (this time from an algorithmic point of view). However, no algorithmic improvement seems to have been achieved for the time being.

The present technique seeks to provide a solution to the problem of accelerating the verification of a given domain of parameters without the drawbacks of already existing solutions (i.e. a solution which, from the viewpoint of the electronic device, does not make it necessary to possess a large memory storage capacity while at the same time preserving its security).

Moreover, the domain of parameters of an elliptic curve is generally public. However, in a communications system, it can happen that such a domain is private (i.e. known only to the users of a communications system who are registered with the system). As a consequence, in this example, the verification of the domains of parameters has to be resistant to side-channel attacks.

The present technique is also aimed at providing a solution to such a problem. In addition, the present technique can be used to accelerate the validation of a domain of parameters for a hyperelliptic curve (see for example Fangguo Zhang et al "*Compact Representation of Domain Parameters of Hyperelliptic Curve Cryptosystems*" for a description of the operations to be performed to validate such a domain of parameters.

3. SUMMARY OF THE INVENTION

One particular embodiment of the invention proposes an electronic device comprising means for receiving at least one cryptographic parameter and means for validating said at least one cryptographic parameter. Such an electronic device is remarkable in that said means for validating comprise:
  means for determining an imprint from a one-way function and from at least said cryptographic parameter;
  means for detecting at least one part of said imprint in a dedicated memory zone of said electronic device, said means for detecting delivering a piece of information on validation if there is effective detection.

According to one particular aspect of the invention, such a device is remarkable in that said means for receiving furthermore comprise means for receiving an identifier of said at least one cryptographic parameter.

According to one particular aspect of the invention, such a device is remarkable in that said one-way function is applied to a concatenation of at least one part of said identifier and of said cryptographic parameter.

According to one particular aspect of the invention, such a device is remarkable in that said identifier is used as an index during the use of the means for detecting.

According to one particular aspect of the invention, such a device is remarkable in that it also comprises means for concatenating at least one part of said identifier with said imprint, that are used following the use of the means for determining, said means for concatenating delivering another imprint which is used for the means for detecting.

According to one particular aspect of the invention, such a device is remarkable in that said at least one cryptographic parameter corresponds to the domain of parameters of the hyperelliptic curve of the g≥1 type.

According to one particular aspect of the invention, said type of said curve is equal to 1 and said domain of parameters comprises the following elements:
  a number q verifying the relationship $q=p^m$, with m being an integer greater than or equal to 1, and p being a prime number greater than or equal to 2;
  coefficients a and b which are elements belonging to the q-element finite field defining an equation of an elliptic curve;
  a point P, belonging to the elliptic curve; and
  a number n corresponding to an order of said point P.

According to one particular aspect of the invention, said domain of parameters furthermore comprises one or more of the following elements:
  a value corresponds to an indication on the manner of representing an element belonging to the finite field $F_q$;
  a value corresponding to a seed enabling the generation of the elements a and b;
  a value of the cofactor of the elliptic curve.

According to one particular aspect of the invention, the device is remarkable in that it enables the manipulation of an elliptic curve corresponding to a curve referenced in any one of the following standards: ANSI X9.62, FIPS 186-2, IEEE P1363, ISO/IEC 15946, SECG.

According to one particular aspect of the invention, such a device is remarkable in that it is capable of manipulating said at least one cryptographic parameter corresponding to the group of parameters comprising: a generator g, a prime number p and a prime number q corresponding to the order of said generator.

Thus, such a technique enables the validation of the parameters of a Diffie-Hellman group as described for example in the RFC 5114 standard entitled: "Additional Diffie-Hellman Groups for Use with IETF Standards".

According to one particular aspect of the invention, said one-way function is a cryptographic hash function.

According to one particular aspect of the invention, said one-way function is an encryption function using an encryption key stored in said device.

According to one particular aspect of the invention, said encryption key stored in said device corresponds to said identifier of said curve.

When the hyperelliptic curve is an elliptic curve, such an identifier can, for example, be a "CurveOID" type identifier as mentioned here above or again an identifier corresponding to a number associated with an identifier as described in the document "SEC 2" (namely for example the identifiers "secp192r1", "secp224k1", etc. in Appendix A of the document "SEC 2" converted into binary numbers).

According to one particular aspect of the invention, such a device is remarkable in that the means for detecting enable the detection of the totality of said imprint in a dedicated memory zone of said electronic device.

According to one particular characteristic, such a device is remarkable in that when said at least one cryptographic parameter is confidential, said means for determining and detecting use masking operations with at least one random number.

According to one particular characteristic, such a device is remarkable in that it comprises means for personalizing enabling the storage of at least one part of said imprint obtained via the means for determining when the means for detecting deliver a piece of non-validating information in case there is no effective detection.

In another embodiment of the invention, a method is proposed for cryptographic processing implemented by an electronic device, said method comprising a step for receiving at least one cryptographic parameter and a step for validating said at least one cryptographic parameter. Such a method is remarkable in that said step for validating comprises:

a step for determining an imprint from the application of a one-way function to at least said cryptographic parameter;

a step for detecting at least one part of said imprint in a dedicated memory zone of said electronic device, said step for detecting delivering a piece of information on validation in case of effective detection.

The general principle of the invention consists therefore in avoiding the application of the prior-art techniques for validating a cryptographic parameter, which have numerous drawbacks as mentioned here above.

Thus, this particular embodiment of the invention relies on a wholly novel and inventive approach which, in a first stage, consists of the storage, in a dedicated memory zone of the device, of at least a part of an imprint resulting from the application of a one-way function on at least one cryptographic parameter of interest (the obtaining of at least one part of an imprint resulting from the application of a one-way function to at least one cryptographic function of interest can done by the device itself, or by a step of storage comprising the transmission of such a piece of information (for example such a step could be performed during the phase for personalizing the electronic device)). Thus, in a second stage, when the electronic device is used to carry out a cryptographic processing using such a cryptographic parameter, this device can carry out a step for validating a received cryptographic parameter more rapidly than in the known solutions of the prior art, when the dedicated memory zone of the electronic device has been completed/referenced as mentioned in the course of a first stage.

It must be noted that, according to this approach, it is therefore not necessary to store the cryptographic parameter of interest, but only one imprint or a part of an imprint resulting from the application of a one-way function is stored in the electronic device. Thus, through such an approach, it is possible to remove the need for validating a cryptographic parameter according to the prior art if the electronic device retrieves an (identical) corresponding element in a memory zone of the electronic device after application of the one-way function.

According to one particular aspect of the invention, such a method is remarkable in that said step for receiving furthermore comprises the reception of an identifier of said at least one cryptographic parameter.

According to one particular aspect of the invention, such a method is remarkable in that said one-way function is applied to a concatenation of at least one part of said identifier and of said cryptographic parameter.

According to one particular aspect of the invention, such a method is remarkable in that the said identifier is used as an index during said step for detecting within said dedicated memory zone.

According to one particular aspect of the invention, such a method is remarkable in that, following the steps for determining, the method comprises a step for concatenating at least one part of said identifier with said imprint, said step for concatenating delivering another imprint that is used for said step for detecting.

According to one particular aspect of the invention, such a method is remarkable in that said at least one parameter corresponds to the domain of parameters of a g≥1 type hyperelliptic curve.

According to one particular aspect of the invention, such a method is remarkable in that said type of said curve is equal to 1 and in that said domain of parameters comprises the following elements:

a number q verifying the relationship $q=p^m$, with m being an integer greater than or equal to 1, and p being a prime number greater than or equal to 2;

coefficients a and b which are elements belonging to the q-element finite field defining an equation of an elliptic curve;

a point P, belonging to the elliptic curve; and a number n corresponding to an order of said point P.

According to one particular aspect of the invention, such a method is remarkable in that said domain of parameters furthermore corresponds to one or more of the following elements:

a value corresponding to an indication on the way to represent an element belonging to the finite field $F_q$;

a value corresponding to a seed enabling the generation of the elements a and b;

a value of the cofactor of the elliptic curve.

According to one particular aspect of the invention, such a method is remarkable in that said elliptic curve corresponds to a curve referenced in any one of the following standards: ANSI X9.62, FIPS 186-2, IEEE P1363, ISO/IEC 15946, SECG.

According to one particular aspect of the invention, such a method is remarkable in that said at least one cryptographic parameter corresponds to the group of parameters comprising: a generator g, a prime number p, and a prime number q corresponding to the order of said generator.

According to one particular aspect of the invention, such a method is remarkable in that said one-way function is a cryptographic hash function.

According to one particular aspect of the invention, such a method is remarkable in that said one-way function is an encryption function using an encryption key stored in said device.

According to one particular aspect of the invention, such a method is remarkable in that said encryption key stored in said device corresponds to said identifier of said curve.

According to one particular aspect of the invention, such a method is remarkable in that said step for detecting consists in detecting the totality of said imprint in a dedicated memory zone of said electronic device.

According to one particular aspect of the invention, such a method is remarkable in that, when said at least one cryptographic parameter is confidential, said steps for determining and for detecting comprises operations for masking with at least one random number.

Thus, when the cryptographic parameter is confidential, the manipulation of such a parameter must be resistant to concealed channel attacks as described for example in Stefan Mangard et al., "*Power Analysis Attacks, Revealing the Secrets of Smart Cards*", published by Springer. Now, the use of a one-way function that is particularly suited to the implementing of efficient countermeasures against this type of attack makes it possible, during a step for validating according to the present invention, to avoid having to give an attacker information on the cryptographic parameter.

According to one particular aspect of the invention, such a method is remarkable in that, when the method is executed during a step for personalizing, and when said attack delivers a piece of information on non-validation if there is no effective detection, the method furthermore comprises a step for storing at least one part of said imprint resulting from the step for determining.

According to another embodiment of the invention, a computer program product is proposed comprising program code instructions for the implementation of the above-mentioned method (in any one of its different embodiments) when said program is executed on a computer.

In another embodiment of the invention, an electronic component is proposed comprising means suited to implementing the above-mentioned method (in any one of its different embodiments).

More specifically, according to a preferred implementation, the different steps of the method according to the invention are implemented by a software program or computer program, this software comprising software instructions intended for execution by a data processor of a relay module according to the invention and being designed to control the execution of the different steps of this method.

Consequently, the invention pertains to a program capable of being executed by a computer or by a data processor, this program comprising instructions to control the execution of the steps of a method as mentioned here above.

This program can use any programming language whatsoever and can be in the form of a source code, and object code or an intermediate code between source code and object code, such as in a partially compiled form or in any other desirable form.

The invention also pertains to an information carrier readable by a data processor and comprising instructions of a program as mentioned here above.

The information carrier can be any entity or device capable of storing the program. For example, the carrier can comprise a storage means such as a ROM, for example a CD ROM or a micro-electronic circuit ROM or again a magnetic recording means, for example a floppy disk or a hard disk drive.

Furthermore, the information medium can be a transmissible carrier such as an electrical or optical signal which can be conveyed via an electrical or optical cable, by radio or by other means. The program according to the invention can, in particular, be downloaded from an Internet type network.

Alternatively, the information carrier can be an integrated circuit in which the program is incorporated, the circuit being adapted for executing or being used in the executing of the method in question.

According to one embodiment, the invention is implemented by means of software and/or hardware components. In this respect, the term "module" can correspond in this document as much to a software component as to a hardware component or to a set of hardware and software components.

A software component corresponds to one or more computer programs, one or more sub-programs of a program or more generally to any element of a program or a software capable of implementing a function or a set of functions according to what has been described here below for the module concerned. Such a software component is executed by a data processor of a physical entity (terminal, server, etc) and is liable to access the hardware resources of this physical entity (memories, recording carriers, communication buses, electronic input/output cards, user interfaces, etc).

In the same way, a hardware component corresponds to any element of a hardware unit capable of implementing a function or a set of functions according to what has been described here above for the module concerned. It can be a programmable hardware component or a component with an integrated processor for the execution of software, for example an integrated circuit, a smart card, a memory card, an electronic card for the execution of firmware, a secure element, used in the context of near-field communications, etc.

Another embodiment of the invention proposes a computer-readable non-transient storage medium storing a computer program comprising a set of instructions executable by a computer to implement the above-mentioned method (in any one of its different embodiments).

4. LIST OF FIGURES

Other characteristics and advantages of the invention shall appear from the following description, given by way of an exemplary and non-exhaustive indication and from the appended drawings, of which:

FIG. 3(*b*) is a microcircuit board constituting an example of an electronic device used to carry out data processing according to the invention as represented in FIG. 3(*a*).

5. DETAILED DESCRIPTION

In all the figures of the present document, the identical elements and steps are designated by a same numerical reference.

Figure 1:
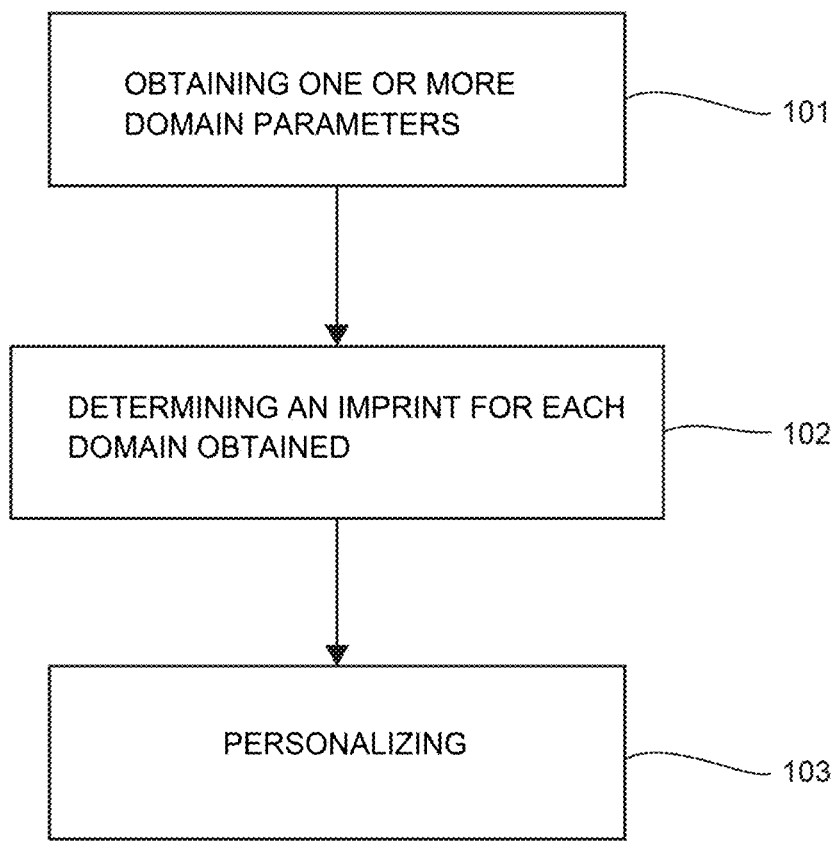
FIG. 1 is a flowchart of a particular embodiment of the invention implemented by a personalizing device.

FIG. 1 is a flowchart of a particular embodiment of the invention implemented by a personalizing device.

Thus, a personalizing device (which corresponds for example to a machine for personalizing smart cards as described for example in the document EP2165292), comprises an interface enabling a user to choose or to explicitly instantiate data that has to be stored in a memory in an electronic device (such as for example a smart card). Thus, according to one particular embodiment of the invention, during the step for obtaining referenced 101, the personalizing device obtains one or more domains of parameters thus defining one or more hyperelliptic curves. The personalizing device can furthermore obtain one or more identifiers associated with the above-mentioned domains.

Then, during a step for determining, referenced 102, the personalizing device through the use of a one-way function determines an imprint for each domain obtained. The imprint thus obtained is intended for storage either totally or partially in a secured, accessorily non-volatile, memory of an electronic device.

More specifically, during the step 102, in one embodiment of the invention, a one-way function is a cryptographic hash function such as the SHA-1, the MD5, the SHA-2, or again the SHA-3 (also called "Keccak"). Thus, the size (in number of bits) of the imprint obtained depends on the choice of the cryptographic hash function used (i.e. for example for the SHA-1, the imprint obtained has a size of 160 bits). A cryptographic hash function of this kind is applied to a concatenation of the different elements included in the domain of parameters defining a hyperelliptic curve. According to one variant, an identifier (if available) can be added to the previous concatenation, the data thus built serving as input data for the cryptographic hash function. According to another embodiment of the invention, the one-way function corresponds to a function of cryptographic encryption by blocks, such as DES or AES encryption. Thus, since such a function inputs two parameters (namely one piece of data to be encrypted and a cryptographic key), according to one embodiment, the cryptographic key corresponds either to an identifier associated with the domain of parameters or to a piece of data as a function of such an identifier (such as for example a part of the imprint resulting from the application of a cryptographic hash function to the identifier mentioned here above), and the piece of data to be encrypted corresponds to the concatenation of the elements of the domain of parameters.

Following the execution of the step 102, the personalizing device carries out a step of personalizing (or storage) referenced 103 which comprises the transmission, to an electronic device, of the element or elements to be stored (determined during the step 102) in a memory of the electronic device. More specifically, depending on the choice of the one-way function and the presence or non-presence of an identifier, the element or elements to be stored can be the following (in the case of an elliptic curve):

either the imprint h=f(q||FR||S||a||b||P||n||h) where the operator "∏" is the concatenation operator and f is the one-way function. Those skilled in the art could arrange the elements of the domain according in another ordering scheme; or the imprint h=f(q||FR||S||a||b||P||n||h||ID) where ID is, represented in the form of a number, an identifier associated with the domain D and f is the one-way function. Those skilled in the art could arrange the elements of the domain according to another ordering scheme; or a part of the imprint mentioned here above (to prevent the storage of an excessively large number of pieces of data in the memories of the devices while at the same time preserving a high level of security (i.e. the probability of a collision between two parts of the imprint should not be excessively high);

the identifier ID associated with a domain D (in this example the electronic device stores for example the pair (ID h) for a given domain of parameters (without of course storing such a domain of parameters)). In one variant, it is not the identifier itself that is stored but a value derived from it (through the application of a hash function for example).

As mentioned during the description of the step 102, the one-way function can also be an encryption function Ek(.), with k being an encryption key which could be for example the result of the application of a cryptographic hash function applied to an identifier.

In addition, a piece of information on the way to determine such elements from a domain of parameters (as well also with, in addition, a curve identifier) can be stored in a memory of the electronic device (for example the choice of the one-way function, the formal structure to be implemented to set up data at input of the one-way function, etc).

In another embodiment, the personalizing steps (corresponding to the instantiation, in a memory of an electronic device, of a particular value corresponding either to an imprint or to a part of an imprint resulting from the application of a one-way function) are performed via a technique known as the OTA (Over the Air) technique as described in the GSM 03.48 standard (when the electronic device is a SIM (for "subscriber identity module") card for example. Thus, in this embodiment, the personalizing device is managed by a mobile telephony operator. In one variant, the electronic device corresponds to a secure element as mentioned in chapter 8 (*Secure Element Management*) of the document "*Near Field Communication, from theory to practice*" by Vedat Coskun et al., published by Wiley, referring especially to documents published by the "Global Platform" consortium such as the document "*Global Platform's Proposition for NFC Mobile: Secure Element Management and Messaging*".

In general, such personalizing steps can be performed between a personalizing device and an electronic device if a secret key is shared between these two devices and known to them alone in order to set up a reliable communications channel.

According to one variant, when an electronic device itself generates a domain of parameters (thus defining an elliptic or hyperelliptic curve), it can carry out a validation of the domain of parameters via classic techniques of the prior art and then store only one imprint or a part of an imprint as mentioned here above after having transmitted, to another device (which for example can be a device comprising a data base of domains of parameters), the elements of the domain of parameters with also an identifier of the electronic device having generated such a domain of parameters.

In one variant of the invention, the electronic device stores, in a secure memory, the imprints of the domains of parameters (without including the value of the cofactor when determining such imprints) in grouping/classifying them as a function of the value of the cofactor h. For example, the imprints of the domains of parameters (obtained without using the value of the cofactor) will grouped together in a same list if the curves all have the value of 1 as a cofactor, and so on and so forth.

It must also be noted that it is possible that the domain of parameters to be considered in performing the step 102 will not include certain elements at the end of the step for determining an imprint (for example the elements S and FR can be avoided).

When the personalizing is completed, the personalizing device sends the electronic device a change-of-state command whose object is to indicate that the electronic device is in use mode. This change-of-state command generates the recording, in the dedicated memory zone comprising the personalizing imprint, of a piece of information representing the putting of the electronic device into service (for example a bit for putting into service).

Figure 2:
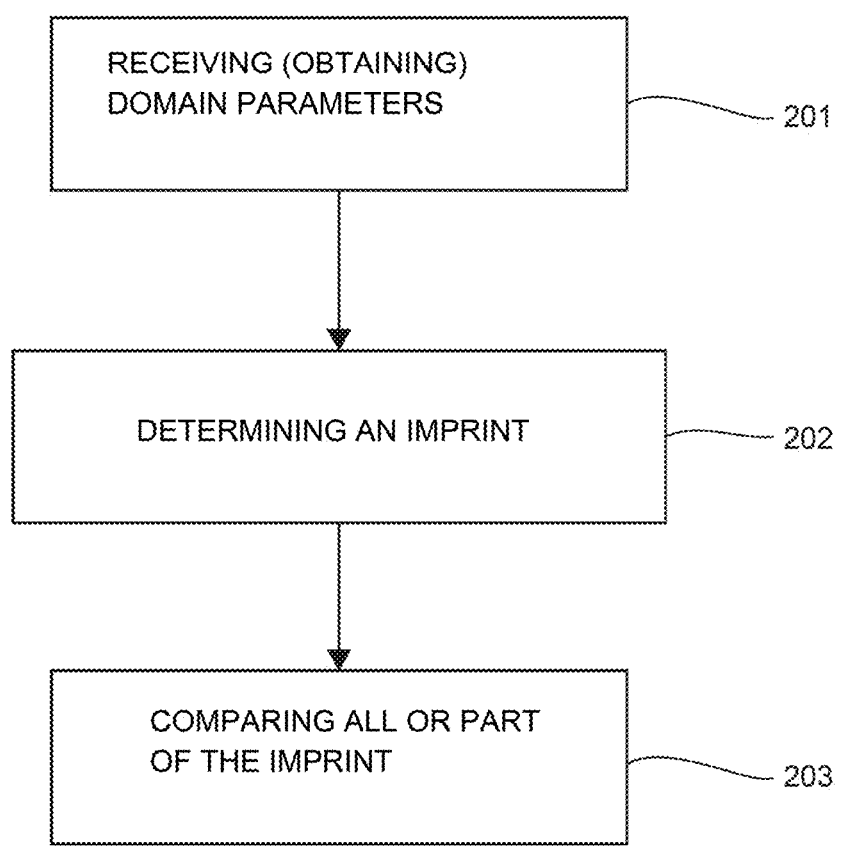
FIG. 2 is a flowchart of a particular embodiment of the method according to the invention implemented by an electronic device performing a cryptographic processing operation requiring the use of a domain of parameters defining a hyperelliptic curve.

FIG. 2 presents a flowchart of a particular embodiment of the method according to the invention implemented by an electronic device performing a cryptographic processing operation requiring the use of a domain of parameters defining a hyperelliptic curve. This method of FIG. 2 is aimed at the verification of the imprint subsequently to the personalizing of the electronic device. This verification takes place for example during the first use of the electronic device.

Thus, during the implementation of a method of cryptographic processing using an elliptic curve (or more generally a hyperelliptic curve), such as a ECDSA (Elliptic Curve Digital Signature Algorithm) type digital signal, or a key exchange such as the ECDH (or Elliptic Diffie-Hellman Curve) or a hash function as mentioned in the article "*How to hash into Elliptic Curves*" by T. Icart, or again any type of protocol described in chapter 4 (*Cryptographic Protocols*) of the document "*Guide to Elliptic Curve Cryptography*" mentioned here above aimed at resolving concrete technical problems in the field of cryptography, the domain of parameters defining a curve must be verified before operations of such cryptographic protocols are carried out.

To this end, an electronic device participating with another electronic device in implementing an elliptic-curve-based cryptographic protocol must, according to one embodiment of the invention, carry out a step referenced 201 for receiving (or obtaining via another device), a domain of parameters defining an elliptic (or hyperelliptic) curve. Such a step therefore consists in obtaining the different constituent elements of a domain of parameters, on the basis of which subsequent operations of a cryptographic protocol must be executed.

Then, during a step for determining referenced 202 which is similar to the step 102, the electronic device determines an imprint (also called a hash) according to a predefined operational mode (especially on the choice of the one-way function to be used or the manner of defining the data to be used as parameters of the one-way function).

Then, (depending here again on a preliminary choice) the electronic device compares all or part of the imprint obtained from performance of the step 202 with data stored in a memory zone.

In the case of positive detection (i.e. if the compared elements are identical), then it is not necessary to proceed to use known techniques to validate a domain of parameters of this kind since, in this case, it has already been done earlier.

In the event of a negative detection (i.e. if the elements compared are not identical), then it is necessary to carry out the use of known techniques to validate such a domain of parameters.

As mentioned here above, the use of an identifier of a curve (elliptic curve or more generally hyperelliptic curve) associated with a domain of parameters can also be used similarly to what was described with reference to FIG. 1.

It must be noted that when the present invention is used, it especially reduces the execution time of a step for validating a domain of parameters. Indeed, a step of validation according to the present invention is about 100 times faster than a step of validation according to the prior art (when the prime number p is of the order of 256 bits).

Figure 3:
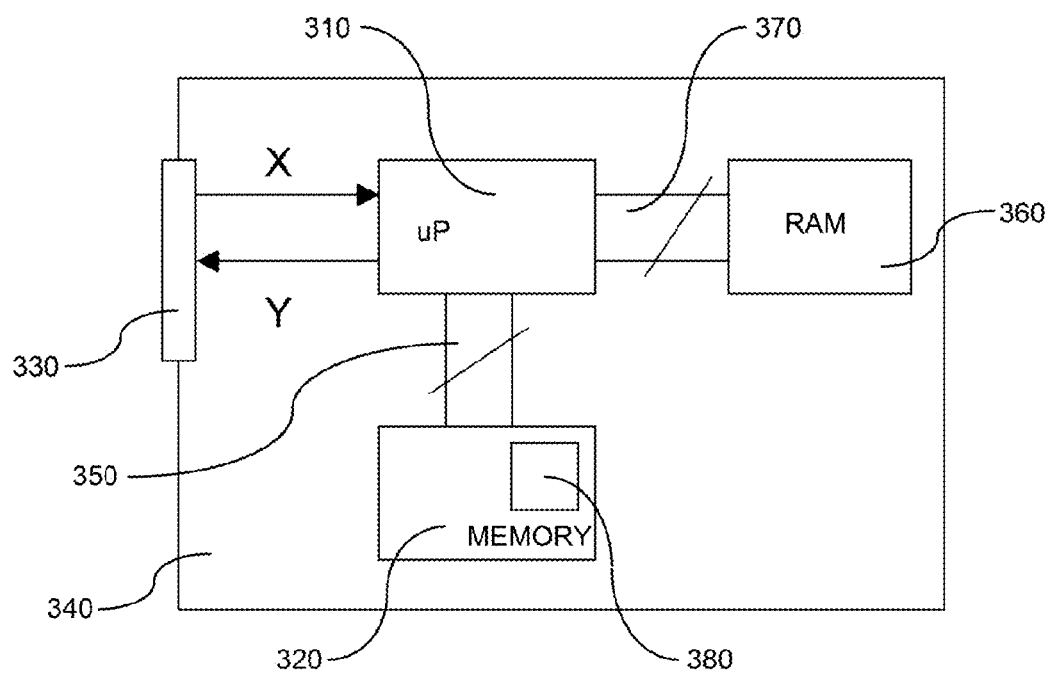
FIG. 3(*a*) is a schematic view of an electronic device used to carry out data processing in which the present invention is implemented.
Figure 3:
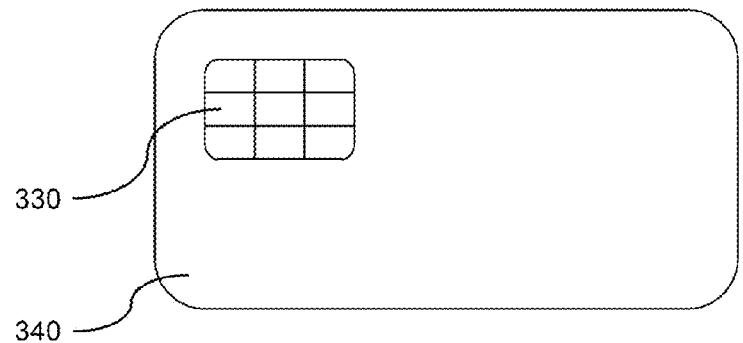

FIG. 3(*a*) gives a schematic view of an electronic device, enabling a data-processing operation, in which the present invention is implemented. This device 340 comprises a microprocessor 310 with which there is associated on the one hand a random-access memory 360, for example through a bus 370 and secondly a non-volatile memory 320 (for example of the EEPROM type) for example through a bus 350.

The data-processing device 340 and specifically the microprocessor 310 that it incorporates can exchange data with external devices by means of a communications interface 330.

FIG. 3(*a*) schematically represents a transmission of a piece of input data X received from an external device (not shown) and transmitted from the communications device 330 to the microprocessor 310. Similarly, the figure shows the transmission of a piece of output data Y from the microprocessor 310 to the communications interface 330 intended for an external device. This piece of output data Y is derived from a data-processing operation by the microprocessor 310, generally performed on the pieces of data or on a part of the input data X by means of a secret data 380 internal to the system. The data processing thus performed can include an execution of the method of comparison according to the present invention.

The input data X are for example APDU commands and the output data Y can be APDU commands capable of comprising an encrypted piece of data, a signature, a random number, etc derived from the data processing mentioned here above.

Although, for the sake of illustration, the input data and the output data are shown on two different arrows, the physical means enabling communications between the microprocessor 310 and the interface 330 could be obtained by single means, for example a series or a series communication port or a bus.

The microprocessor 310 is capable of executing a software program (or computer program) enabling the electronic device to execute a method according to the invention with reference to FIG. 2. This step is for example executed by the electronic device upon reception of input data X. The data of the method according to the invention can be obtained from input data. The pieces of input data are for example obtained from the result of the method according to the invention (for example transmission of the validation of the domain of parameters received (included in the piece of input data X)). The software is formed by a series of instructions for commanding the microprocessor 310 which can for example be stored in the memory 320.

In one variant, the unit formed by the microprocessor 310, the non-volatile memory 320 and the random-access memory 360 can be replaced by an application-specific circuit which then comprises means for implementing the different steps of the data-processing method. More generally, the processing device is an integrated circuit.

FIG. 3(*b*) represents a microcircuit card constituting an example of a data-processing device according to the invention as represented in FIG. 3(*a*). The communications interface 330 in this case is made by means of contacts of the microcircuit card or else an antenna housed in the card body. The microcircuit card incorporates a microprocessor 310, a random-access memory 360 and a non-volatile memory 320 as represented in FIG. 3(*a*).

This microcircuit card is compliant for example with the ISO 7816 standard and provided with a secured microcontroller that groups together the microprocessor (or CPU) 320 and the random access memory 360.

The input data X are for example APDU commands and the output data Y are APDU responses.

In one variant, the data-processing device can be a USB key, a document or a information carrier made of paper comprising in one of its sheets a microcircuit associated with contactless communications means. This is a preferred manner of a portable or pocket electronic entity.

The device is for example secured. For example, the device comprises means capable of protecting it against attacks aimed at fraudulently obtaining the secret data that it memorizes (for example a cryptographic key) such as fault attacks and/or side-channel attacks. In particular, the device is compliant with the FIPS standard or with common criteria.

The invention claimed is:

1. An electronic device comprising:
   a communications interface, configured to connect with devices distinct from and external to said electronic device, and
   a microcircuit, contained within said electronic device, said microcircuit comprising a microprocessor and a memory, said microcircuit being programmed to execute the following steps, in that order:
   preliminarily storing an imprint received from an electronic apparatus through the communications interface, in a dedicated memory zone of said memory, wherein the stored imprint is determined from a one-way function and from at least one elliptic curve cryptographic parameter;
   receiving at least one elliptic curve cryptographic parameter from another electronic device, through the communications interface, said another electronic device participating with said electronic device to a cryptographic protocol;
   validating said received at least one elliptic curve cryptographic parameter, wherein said validating comprises:
      determining an imprint from the one-way function and from at least said received elliptic curve cryptographic parameter; and
      detecting at least one part of said determined imprint in said dedicated memory zone of said memory, wherein said detecting delivers a piece of information on validation if there is effective detection; and
   after validating, further implementing the cryptographic protocol using said received at least one elliptic curve cryptographic parameter, if the detecting is effective.

2. The electronic device according to claim 1, wherein said microcircuit is furthermore programmed for receiving an identifier of said received at least one elliptic curve cryptographic parameter.

3. The electronic device according to claim 2, wherein microcircuit is furthermore programmed to apply said one-way function to a concatenation of at least one part of said identifier and of said received elliptic curve cryptographic parameter.

4. The electronic device according to claim 2, wherein said microcircuit is furthermore programmed to use said identifier as an index during detection of said at least one part of said determined imprint.

5. The electronic device according to claim 2, wherein said microcircuit is further programmed in order to:

after the step of determining, concatenate at least one part of said identifier with said determined imprint to deliver a second imprint, and
during the step of detecting, detect at least one part of said determined imprint in the dedicated memory of said electronic device by detecting at least one part of said second imprint in the dedicated memory of said electronic device.

6. The electronic device according to claim 1, wherein said received at least one elliptic curve cryptographic parameter corresponds to the domain of parameters of the hyperelliptic curve of the g≥1 type.

7. The electronic device according to claim 6, wherein said type of said curve is equal to 1 and said domain of parameters comprises the following elements:
   a number q verifying the relationship $q=p^m$, with m being an integer greater than or equal to 1, and p being a prime number greater than or equal to 2;
   coefficients a and b which are elements belonging to the q-element finite field defining an equation of an elliptic curve;
   a point P, belonging to the elliptic curve; and
   a number n corresponding to an order of said point P.

8. The electronic device according to claim 7, wherein said domain of parameters furthermore comprises one or more of the following elements:
   a value corresponding to an indication on the manner of representing an element belonging to the finite field $F_q$;
   a value corresponding to a seed enabling the generation of the elements a and b;
   a value of the cofactor of the elliptic curve.

9. The electronic device according to claim 7, wherein said elliptic curve corresponds to a curve referenced in any one of the following standards: ANSI X9.62, FIPS 186-2, IEEE P1363, ISO/IEC 15946, SECG.

10. The electronic device according to claim 2, wherein:
    said received at least one elliptic curve cryptographic parameter corresponds to the domain of parameters of the hyperelliptic curve of the g≥1 type;
    said one-way function is an encryption function using an encryption key stored in said electronic device; and
    said encryption key stored in said device corresponds to said identifier of said elliptic curve.

11. The electronic device according to claim 1, wherein said received at least one elliptic curve cryptographic parameter corresponds to the group of parameters consisting of: a generator g, a prime number p and a prime number q corresponding to the order of said generator.

12. The electronic device according to claim 1, wherein said one-way function is a cryptographic hash function.

13. The electronic device according to claim 1, wherein said one-way function is an encryption function using an encryption key stored in said electronic device.

14. The electronic device according to claim 1, wherein said microcircuit is furthermore programmed to detect the totality of said determined imprint in the dedicated memory zone of said electronic device.

15. The electronic device according to claim 1, wherein said microcircuit is furthermore programmed to use masking operations with at least one random number during the steps of determining and detecting when said received at least one elliptic curve cryptographic parameter is confidential.

16. The electronic device according to claim 1, wherein the microcircuit is further programmed to personalize the electronic device, enabling the storage of at least one part of said determined imprint when the detecting delivers a piece of non-validating information if there is no effective detection.

17. The electronic device according to claim 1, wherein said dedicated memory zone comprising the preliminarily stored imprint is a non-volatile memory.

18. A method of cryptographic processing implemented by an electronic device, comprising the following steps executed in that order:
preliminarily storing an imprint received from an electronic apparatus, in a dedicated memory zone of said electronic device, said dedicated memory zone being contained within said electronic device, said electronic apparatus being distinct from and external to said electronic device, and wherein the stored imprint is determined from a one-way function and from at least one elliptic curve cryptographic parameter;
receiving at least one elliptic curve cryptographic parameter through a communications interface of the electronic device, from another electronic device, said another electronic device being distinct from and external to said electronic device and participating with said electronic device in a cryptographic protocol;
validating said received at least one elliptic curve cryptographic parameter with the electronic device, wherein validating comprises:
determining an imprint from application of the one-way function to at least said received elliptic curve cryptographic parameter; and
detecting at least one part of said determined imprint in said dedicated memory zone of said electronic device, wherein detecting delivers a piece of information on validation if there is effective detection; and
after validating, further implementing the cryptographic protocol using said received at least one elliptic curve cryptographic parameter, if the detecting is effective.

19. The method according to claim 18, wherein said at least one parameter corresponds to the domain of parameters of a g≥1 type hyperelliptic curve.

20. The method according to claim 18 wherein, in case of negative detection, the method comprises carrying out another validation technique to validate said received at least one elliptic curve cryptographic parameter received from said another electronic device.

21. A computer-readable and non-transient storage medium storing a computer program comprising a set of instructions executable by a computer to implement a method comprising the following steps executed in that order:
preliminarily storing an imprint received from an electronic apparatus in a dedicated memory zone of an electronic device, said dedicated memory zone being contained within said electronic device, said electronic apparatus being distinct from and external to said electronic device, and wherein the stored imprint is determined from a one-way function and from at least one elliptic curve cryptographic parameter;
receiving at least one elliptic curve cryptographic parameter through a communications interface of said electronic device, from another electronic device, said another electronic device being distinct from and external to said electronic device and participating with said electronic device in a cryptographic protocol;
validating said received at least one elliptic curve cryptographic parameter with the electronic device, wherein validating comprises:
determining an imprint from application of the one-way function to at least said received elliptic curve cryptographic parameter; and
detecting at least one part of said determined imprint in said dedicated memory zone of said electronic device, wherein detecting delivers a piece of information on validation if there is effective detection; and
after validating, further implementing the cryptographic protocol using said received at least one elliptic curve cryptographic parameter, if the detecting is effective.

22. System comprising
a personalizing device,
an electronic device, and
another electronic device, which is configured to participate with said electronic device to a cryptographic protocol,
said electronic device comprising:
a communications interface, configured to connect with devices distinct from and external to said electronic device, and
a microcircuit, contained within said electronic device, said microcircuit comprising a microprocessor and a memory, said microcircuit being programmed to execute the following steps, in that order:
preliminarily storing an imprint received from said personalizing device through the communications interface, in a dedicated memory zone of said memory, wherein the stored imprint is determined from a one-way function and from at least one elliptic curve cryptographic parameter;
receiving at least one elliptic curve cryptographic parameter from said another electronic device through the communications interface;
validating said received at least one elliptic curve cryptographic parameter, wherein validating comprises:
determining an imprint from the one-way function and from at least said received elliptic curve cryptographic parameter; and
detecting at least one part of said determined imprint in said dedicated memory zone of said memory, wherein detecting delivers a piece of information on validation if there is effective detection; and
after validating, further implementing the cryptographic protocol using said received at least one elliptic curve cryptographic parameter, if the detecting is effective.

* * * * *